(No Model.)
J. HANSEL.
BUCKBOARD WAGON.
No. 251,115. Patented Dec. 20, 1881.
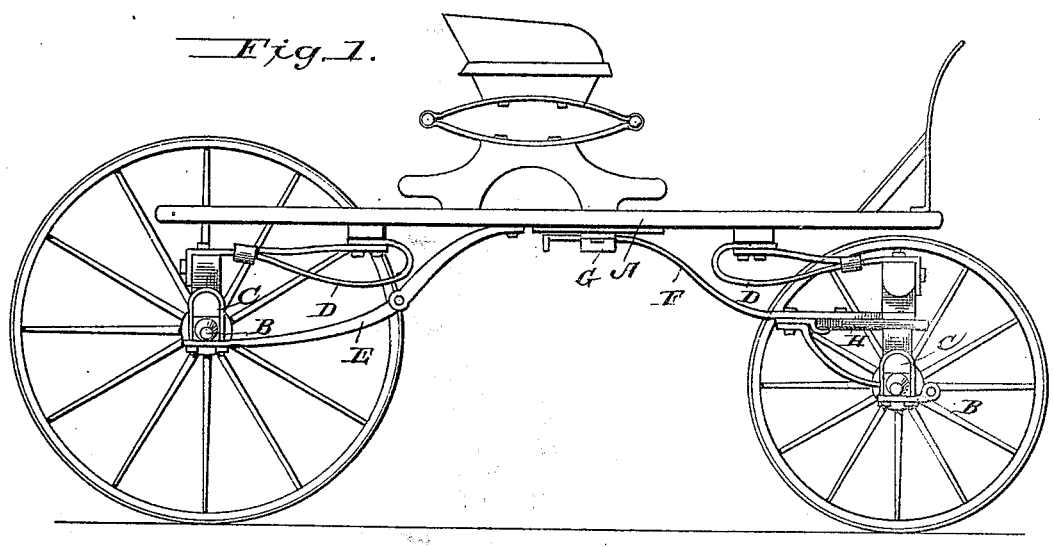
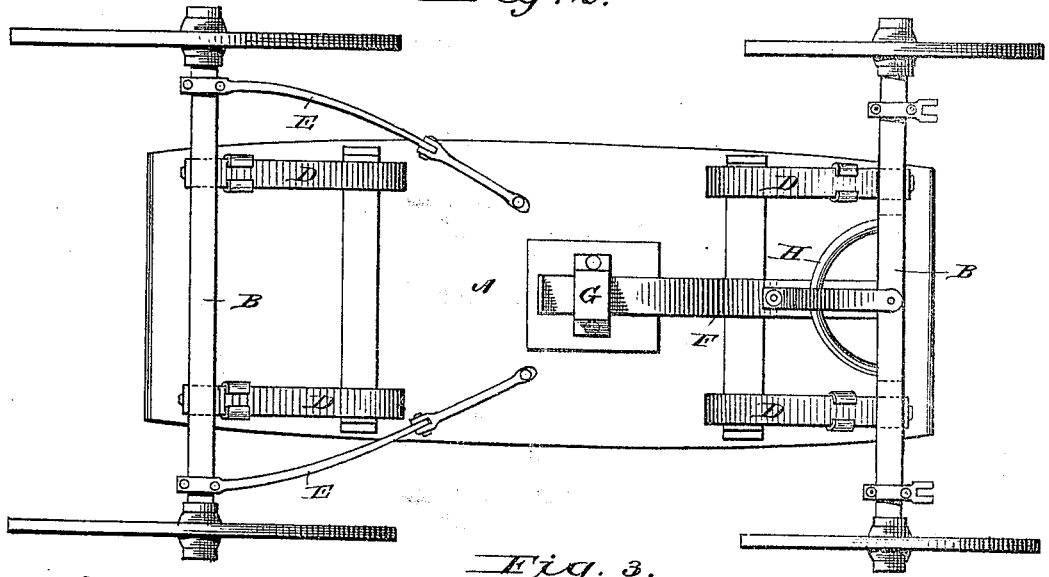
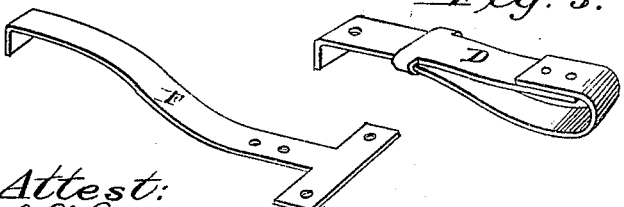
Attest:
H. L. Perrine,
A. M. Long.
Inventor:
Jos. Hansel.
By J. B. Webster,
Atty.

UNITED STATES PATENT OFFICE.

JOSEPH HANSEL, OF STOCKTON, CALIFORNIA.

BUCKBOARD-WAGON.

SPECIFICATION forming part of Letters Patent No. 251,115, dated December 20, 1881.

Application filed May 4, 1880. (No model.)

*To all whom it may concern:*

Be it known that I, JOSEPH HANSEL, of Stockton, in the county of San Joaquin and State of California, have invented a new and useful Improvement in the kind of Vehicles called "Buckboards," of which the following is a specification.

The invention relates particularly to attaching the spring-boards or bed-bottoms of buckboards to the running-gears of same.

The object of my invention is to provide an easy and safe-riding vehicle of the kind above mentioned. I attain these objects as illustrated in the accompanying drawings, in which—

Figure 1 is a side elevation of the vehicle; Fig. 2, a bottom view thereof; and Fig. 3, detached perspective views of my improved spring and brace, hereinafter more particularly specified.

Similar letters refer to similar parts throughout the several views.

In the drawings, the letter A indicates the bottom of the vehicle, attached at its forward end to the axle B and head-block C by means of the springs D.

The letter F indicates a safety spring-brace, held to the bottom of board A by the clamp G in a manner that will permit the spring-brace to slide in the said clamp. The other end of the spring-brace is connected to the half-circle or fifth-wheel H and head-block C. The rear end of the board A is connected to the axle B by means of the springs D and hinged rods E, which last act as braces.

I form the improved spring D by taking a piece of spring-steel, of any desired length, and curve or bend it, so that when so curved or bent the one end will be four or five inches behind the end which is attached to the running-gear. I then attach this last mentioned to the running-gear in the usual way by bolt or clamp. The other end I attach or clamp loosely around the body of the spring, as shown, so that when the vehicle-body springs up or down this end of the spring moves easily back and forth on its bearings. This arrangement furnishes a simple, cheap, safe, and easy-riding spring, and one that has long been needed on vehicles, not only of the kind termed "buckboards," but on other two and four wheeled vehicles. In the manufacture of this spring D two pieces of steel may be used by riveting the joints strongly, thus enabling the mechanic to work up stock not usually regarded as adapted for vehicle-springs.

The advantages that are to be derived by the use of the combination safety spring and brace F, its clamp-holder G, and half-circle H are that as the bed-bottom settles down by the motion of the vehicle the shoulder at the upper end of the spring F is held by the clamp-holder G, and thus prevents an undue strain upon the springs D. At its lower end this spring F is fastened by a clamp to the half-circle H, and by the king-bolt, passing through a hole in its lower end, it is secured to the axle B. This spring F also acts as a brace to steady the vehicle, and takes the place of a reach, and also admits of using lighter material in the forward springs, D, thus cheapening the cost of same, and also admits of the vehicle carrying a heavier load at its forward end over the forward springs, D, and also, by reason of the forward springs, D, being of lighter material, they impart an easy, comfortable motion to the body of the vehicle while in use and in motion.

I am aware that the half-circle H is not new. Hence I only claim it as in connection with the spring F.

The hinged rods E, which brace the rear end of the bed-bottom A, are a valuable auxiliary, for the reason that, were the bed-bottom attached to the running-gear at its rear end by the springs D only, it would be quite unsafe, owing to the up-and-down motion of the spring-boards (used in buckboards) of the bed-bottoms. The rods E, being hinged, allow of this above-described up-and-down motion, yet act at the same time as substantial and strong braces.

Although my above-described improvements are peculiarly applicable to the style of vehicles termed "buckboards," yet they can be applied to advantage, in many instances, to any style of two and four wheeled vehicles.

No claim is here made to the construction of the spring D, for that is shown in the patent to J. S. Corban, May 17, 1881.

Having thus described my invention, what I claim, and desire to secure by Letters Patent, is—

1. The combination of bottom A, axle B, hinged braces E, and springs D, constructed so that one portion will slide along the other, substantially as set forth.

2. The bottom A, connected to the forward running-gear by springs D and spring-brace F, and to the rear running-gear by springs D and hinged braces E, the springs D being constructed so that one portion will slide along the other, substantially as and for the purpose set forth.

JOSEPH HANSEL.

Witnesses:
  JOHN E. BUDD,
  ELIHU B. STOWE.